Patented Oct. 21, 1952

2,615,058

UNITED STATES PATENT OFFICE 2,615,058

METHOD OF PURIFYING NAPHTHALENE BY CRYSTALLIZATION

Wojciech Swietoslawski, Pittsburgh, Pa., assignor to Koppers Company, Inc., Pittsburgh, Pa., a corporation of Delaware No Drawing. Application October 19, 1946, Serial No. 704,535

2 Claims. (Cl. 260—674)

This invention relates to the separation of pure components from contaminating constituents by crystallization. More particularly the invention relates to purification by crystallization to separate desired components from contaminating constituents wherein selective solvents are used to prevent contaminants from entering into or being attached to the crystal component being formed.

It is common practice to employ solvents when separating substances by crystallization. In such method the solvent is generally used to modify the viscosity of the mother liquor or to change the crystallization rate or to lower the crystallization temperature.

The primary object of the present invention is to provide a method of obtaining highly pure compounds by utilizing solvents which prevent the impurity or contaminants from being attached to or absorbed by the crystalline surfaces either during or at the completion of the crystallization.

Another object of the invention is to provide a method of obtaining pure substance by crystallization from mother liquors by solvents which hold the contaminating components in solution, while the desired component is being crystallized.

A further object of the invention is to provide a method of obtaining pure substances by crystallization from mother liquor by solvents which form eutectics with the substance, the contaminants, or both, whereby the desired substances may be crystallized at temperatures which are far removed from the eutectic freezing temperature and thus permit a close separation of the desired substance usually in a state of high purity.

A further object of the invention is to provide a method of obtaining pure substances by crystallization from mother liquor by solvents which form solid solutions with the substance being purified whereby the selective action consists in replacing in the crystalline structure of the precipitate most of the molecules of the contaminants by the molecules of the selective solvent so that the contaminants remain in the mother liquor.

A still further object of the invention is to provide a method of purifying benzene, cyclohexane, naphthalene and other substances by a mixture of selective solvents which hold the contaminants in solution during the crystallization of those substances.

With these and other objects in view the invention consists in the method of separating pure components from contaminants by crystallization by the use of selective solvents which form eutectic mixtures or solid solutions with the component being purified.

For instance, benzene is commonly purified by being crystallized from its liquid state wherein the benzene is agitated while it is being cooled to build up the benzene crystals and permitting a slurry of benzene and impurities to remain in the mother liquor which is separated from the crystalline mass. In other cases a wall of solid benzene is formed on the cold walls of the crystallizer.

In this process the impurities tend to deposit on the crystals as they grow, or to be absorbed by the crystals, so that with repeated crystallizations from a benzene mass the highest degree of purity which may be obtained from commercial benzene contains from 0.035 to 0.050% by weight of impurities.

I have found that when using selective solvents which form eutectic mixtures with the eutectic temperatures lying far below the crystallization temperature considerably purer substance, as for instance, benzene can be manufactured. Among the seelctive solvents those with a distinctive polarity of their molecules are more desirable for protecting the crystals from being contaminated with impurities present in the substance submitted to the purification. Furthermore, if a solvent keeps the impurities in the solution the substances (as for instance benzene) precipitate in a state many times more pure than if no selective solvent or mixture of solvents are used.

My tests have shown that such polar solvents like alcohols, acids, ketones and aldehydes, or mixture of them, are absorbed more easily by the surfaces of growing or already formed crystals (for instance benzene) than the contaminants. For this reason the precipitate contains the solvents instead of its own impurities. The solvents are chosen so as to be easily removable from the precipitate and the mother liquor by any of the conventional ways. In that case the precipitate is obtainable in a high degree of purity.

These polar solvents are much more effective in the purification of benzene, cyclohexane and other types of hydrocarbons and other compounds if water is added to the polar solvent. Water itself is a polar substance and when dissolved in the alcohols, aldehydes or ketones, it favors the purification of the substances submitted to purification. With these aldehydes, ketones or alcohols from 3 to 20% of water has been found to be especially effective in separating the impurities from the desired constituent (as for instance benzene). Furthermore, the use of 3 to 20% of water will permit the crystallization of the desired constituent, as for instance benzene, at a temperature higher than if no water is used.

Furthermore, as stated above, any kind of polar solvent or mixtures of them are chosen so that the separation from the precipitate or from the mother liquor becomes an easy and conventionally known operation.

As an example of purification of benzene, a sample was taken which is sold on the market as nitration grade benzene, which had a freezing temperature of 0.38° C. lower than the freezing temperature of chemically pure benzene. 400 ml. of this benzene were mixed with 2030 ml. of methanol containing 300 ml. of water. The solution was cooled to −10° C. and the crystals removed from the mother liquor by filtration. After the crystals were melted the freezing temperature was found to be 0.03° C. lower than the freezing temperature of pure benzene which contained not more than 0.002% to 0.003% of contaminants.

150 ml. of the sample obtained from the first crystallization were mixed with 500 ml. of methanol and cooled down to 0° C. Then 90 ml. of water were added in successive portions as the mixture was vigorously stirred and at the same time the temperature was lowered to −12° C. The crystals formed were separated by filtration and the methanol separated from the benzene by means of water. After the methanol and water had been separated the product was practically identical with the pure sample used for comparison which contained from 0.002% to 0.003% of contaminants.

Alkylated benzenes, such as xylene isomers are very often obtained as mixtures of different isomeric compounds which may be effectively separated by means of a mixture of polar solvents, such as water, when used with alcohols, esters or ketones. In accordance with the method described above, water acts effectively with the lower aliphatic alcohols, such as methyl, ethyl and isopropyl alcohols, and the lower alkyl aldehydes and ketones. The higher boiling higher molecular weight alcohols, aldehydes and ketones are less soluble in water and are more viscous. Therefore the lower boiling non-viscous solvents are to be desired. Further these low boiling compounds may be more readily separated from the hydrocarbons being purified. The same invention pertains to purification of other hydrocarbons, for instance naphthalene, cyclohexane, and susbtances belonging to other groups of organic compounds. In this case it is desirable to add to polar solvents some amounts of non-polar substances which increase the solubility of the contaminants in the mother liquor. As in the example of benzene the highest possible crystallization and filtration temperature should be used because the higher the temperature at which the crystals have been formed and separated the lower is the impurity content, especially of those compounds characterized by lower melting temperature than the substance undergoing crystallization. The presence of water permits one to increase the crystallization temperature because it decreases the solubility of the substances undergoing precipitation while at the same time it protects the substances from the contaminants. It permits also the use of larger quantities of polar low freezing solvents which is essential for securing a high purity of the precipitates. The composition of the mixture used as a solvent should be rich enough in methanol to keep in solution not only the contaminants but also some of the main component undergoing purification. For instance, if 100 parts of crude naphthalene are dissolved in an amount of methanol ranging from 100 to 400 parts, and if from 3 to 20% of water based on the methanol are added, an adequate crystallization temperature ranging from 0° to 60° C. can be chosen so as to get naphthalene with the freezing temperature from 79° to 79.6° C. Water may be added necessarily as the crystallization proceeds.

The following is an example of the use of selective solvents for the purification of naphthalene which involves the formation of solid solutions. The crude naphthalene used contained thionaphthene which forms solid solutions with naphthalene, the freezing temperature of the thionaphthene being 31° to 32° C. The naphthalene also contained non-freezing oily contaminants. 300 grams of crude naphthalene having a freezing temperature of 74.5° C. was melted and poured into 750 grams of methanol and then cooled to 50° to 52° C. to crystallize the naphthalene. The large excess of methanol acted to hold the thionaphthene and oily impurities in solution so that 180 grams of naphthalene having a freezing temperature of 79° C. was separated from the mother liquor. 50 grams of water was then added to the mother liquor which was cooled to about 50° C. and naphthalene was crystallized. 80 grams of naphthalene having a freezing point of 78.1° C. were separated from the mother liquor. Thereafter 400 grams of methanol and 150 grams of water were added to the mother liquor which was then cooled to about 50° C. to crystallize naphthalene. 20 grams of naphthalene having a freezing temperature of 77.9° C. was separated from the mother liquor. 50 grams of water may be added to the mother liquor remaining and the mixture cooled to about 50° C. whereupon further naphthalene will crystallize. This naphththalene is impure and should be added to a crude naphthalene such as the starting material of this example.

Although no water was added with the methanol to the naphthalene in the first crystallization stage, repeated experiments have shown that it is preferable to add water. Furthermore, these experiments show that if water is added fewer stages of crystallization are required in order to obtain a pure substance.

In another example 100 grams of crude naphthalene having a freezing temperature of 79.30° C. and containing 1.13% by weight of thionaphthene was dissolved in 500 grams of methanol containing 0.5% of water and 75 grams of thiophene. This mixture was cooled to about 50° C. and 95 grams of naphthalene having a freezing temperature of 79.84° C. was recovered after removing thiophene from the crystals by ordinary distillation. The mother liquor contained 55% of the thionaphthene present in the starting material.

When this crude naphthalene of 79.30° C. freezing temperature was dissolved in pure thiophene and cooled to 50° C. the bulk of the naphthalene separated in one crystallization to have a freezing temperature of 80.04° C. The thionaphthene remained in the mother liquor along with the bulk of the thiophene and some of the thiophene was separated from the purified naphthalene by distillation.

For the purification of cyclohexane a sample of cyclohexane having a freezing temperature of 1.74° C. lower than the freezing temperature of a pure sample was utilized. The pure sample had a freezing temperature of 6.55° C. 150 ml. of crude cyclohexane were mixed with 500 ml. of methanol and the mixture was cooled down to 0° C. Thereafter 90 ml. of water were slowly added in successive portions under vigorous stirring and the temperature reduced to −16° C. The precipitated cyclohexane was removed by centrifuging. The crystals after melting were washed with water to separate methanol. The purified cyclohexane had a melting temperature of 0.34° C. lower than the melting temperature of pure cyclohexane. Thus more than 80% of the contaminants had been removed. A sample of the purified cyclohexane was submitted to a second crystallization under the same conditions and in the same proportions and this cyclohexane purified by recrystallization had a freezing point substantially equal to that of chemically pure cyclohexane.

The preferred form of the invention having been thus described, what is claimed as new is:

I claim:

1. A method of purification of naphthalene containing impurities such as thionaphthenes and oily contaminants which comprises dissolving the impure naphthalene in an excess by weight of a mixture consisting of methanol, thiophene and water, cooling the solution to a temperature of 50° to −25° C. to fully crystallize the naphthalene and form eutectic mixtures of the methanol with the impurities, separating the crystallized naphthalene from the solution by filtration, and washing the crystals with the solvent mixture.

2. The method defined in claim 1 in which the solvent is used in large excess of the amount of naphthalene and consists of 84 to 84.5% methanol, 1 to 0.5% water and 15% thiophene.

WOJCIECH SWIETOSLAWSKI.

REFERENCES CITED

The following references are of record in the file of this patent:

UNITED STATES PATENTS

| Number | Name | Date |
|---|---|---|
| 2,204,059 | Acken | June 11, 1940 |
| 2,293,676 | Myers et al. | Aug. 18, 1942 |
| 2,321,117 | Wilcock | June 8, 1943 |
| 2,398,526 | Greenburg | Apr. 16, 1946 |

OTHER REFERENCES

Jenkins Jour. Am. Chem. Soc., vol. 47, 904–910 (1925).

Morton Laboratory Technique in Organic Chemistry, published by McGraw-Hill Book Co. (1938) N. Y. 1st Ed.